(12) United States Patent
Kurosawa

(10) Patent No.: US 6,341,010 B1
(45) Date of Patent: Jan. 22, 2002

(54) FILM SCANNER

(75) Inventor: Yuichi Kurosawa, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/637,921

(22) Filed: Aug. 14, 2000

(30) Foreign Application Priority Data

Aug. 18, 1999 (JP) .......................................... 11-231654

(51) Int. Cl.[7] ........................ G03B 27/62; G03B 27/52; G03B 27/44; G03B 13/18; G03B 1/00
(52) U.S. Cl. .............................. 355/75; 355/40; 355/54; 396/89; 396/120; 352/166; 352/180
(58) Field of Search ............................... 355/75, 40, 54; 396/89, 120; 352/180, 166

(56) References Cited

U.S. PATENT DOCUMENTS 5,162,842 A * 11/1992 Shiota .......................... 355/40
5,912,724 A * 6/1999 Sakaguchi .................... 355/32
6,130,993 A * 10/2000 Hayakawa ................... 396/55

* cited by examiner

Primary Examiner—Russell Adams
Assistant Examiner—Khaled Brown
(74) Attorney, Agent, or Firm—Greenblum & Bernstein, P.L.C.

(57) ABSTRACT

A film scanner for scanning an image formed on a film, is provided with a line sensor unit that scans the image in a main scanning direction, and a table supporting the film. The table is slidable in an auxiliary scanning direction. A geared transmission is provided to receives the driving force of a driving source and outputs, to a table driving mechanism, one of a first and a second driving force. The first driving force is a force with which the table driving mechanism drives the table in a forward direction at a first speed, and the second driving force is a force with which the table driving mechanism drives the table in a reverse direction at a second speed that is different from the first speed.

14 Claims, 5 Drawing Sheets

FILM SCANNER

BACKGROUND OF THE INVENTION

The present invention relates to a film scanner capable of capturing images formed on silver-salt films.

Recently, as personal computers become widespread, images are captured to generate image data, and a personal computer is used for processing or recording captured electronic images (i.e., the image data). Conventionally, a scanner and a digital camera have been used for capturing images. It has been desired that the images formed on a silver-salt film are captured. Conventionally, for capturing images printed on photographic papers, a scanner has been used. However, the scanner cannot capture the images formed on the film directly.

In order to capture images on the film directly, a film scanner has been developed. As the conventional scanner does, the film scanner has a CCD line sensor which receives light passed through the film. The image is scanned in a predetermined direction (i.e., a main scanning direction) in which the line sensor extends, while a table on which the film is mounted is slid relative to the line sensor in a direction (i.e., an auxiliary scanning direction) perpendicular to the main scanning direction, thereby a two-dimensional area is scanned.

In such a film scanner, it is sometimes required to capture images at a plurality of scanning resolutions. For example, a prescanning may be executed to confirm the scanning area before a normal scanning (i.e., a principal scanning) for capturing the image is executed. The scanning resolution of prescanning need not be as high as that of the normal scanning. Generally, when the scanning resolution is higher, the longer time is required for scanning. Therefore, it is preferable that a prescanning is executed at a lower resolution in order to reduce the time for scanning. In order to lower the resolution in the above-described film scanner, the pitch in the auxiliary direction may be enlarged. For enlarging the pitch in prescanning, in a conventional film scanner, the rotating rate of the motor for sliding the table could be increased. However, in order to implement such control in the conventional film scanner, the structure as well as the control circuits of the motor would be complicated.

In another conventional film scanner, when the prescanning is performed, the scanning of the image in the auxiliary direction is executed at every predetermined intervals, without increasing the rotating speed of the motor. Such control, however, does not reduce the time required for prescanning although the scanning pitch in the auxiliary scanning direction is enlarged.

SUMMARY OF THE INVENTION

It is therefore an object of the invention to provide an improved film scanner capable of performing a prescanning faster than a normal scanning, without complicating the structure thereof.

For the above object, according to the present invention, there is provided a film scanner for scanning an image formed on a film, which is provided with a line sensor that scans the image in a main scanning direction, a table supporting the film, the table being slidable forwardly and reversely in an auxiliary scanning direction that is perpendicular to the main scanning direction, a driving source generating a driving force, a table driving mechanism that drives the table in the auxiliary scanning direction, and a geared transmission that receives the driving force of the driving source and outputs, to the table driving mechanism, one of a first and a second driving force. The first driving force is a force with which the table driving mechanism drives the table in a forward direction at a first speed, and the second driving force is a force with which the table driving mechanism drives the table in a reverse direction at a second speed that is different from the first speed.

With this configuration, the driving force of the driving source is converted into a movement at a first speed or a second speed. Therefore, a time period required for scanning can be reduced when scanned at the first speed than the second speed.

Preferably, the drive source includes a stepping motor.

Optionally, the geared transmission including a planet clutch, which is provided with a sun gear secured to a driving shaft of the stepping motor, first and second planet gears meshing with the sun gear. The first and second planet gears are rotatable around the sun gear in association with the rotation of the sun gear. The planet clutch is further provided with first and second driven gears, the first and second driven gears having different numbers of teeth. The first planet gear meshes with the first driven gear when the sun gear rotates forwardly, and the second planet gear meshes with the second driven gear when the sun gear rotates reversely.

Preferably, when the first planet gear meshes with the first driven gear, the second planet gear is disengaged from the second driven gear, and when the second planet gear meshes with the second driven gear, the first planet gear is disengaged from the first driven gear.

In particular, the planet clutch has a rotatable arm rotatably supported by the driving shaft of the stepping motor. The rotatable arm extends in a radial direction of the sun gear, and the first and second planet gears are rotatably supported at end portions of the rotatable arm.

Optionally, the table driving mechanism includes a rack and pinion mechanism. The pinion, the first driven gear and the second driven gear are integrally formed and rotatable coaxially. The rack formed on one surface of the table, the rack meshing with the pinion.

Further optionally, the film scanner further includes a film holder in which the film is inserted, the film holder being slidably supported on the table so that a desired frame of the image formed on the film could be scanned.

Still optionally, the first speed is greater than the second speed.

Preferably, scanning at a lower resolution is performed when the first planet gear meshes with the first driven gear, and scanning at a higher resolution is performed when the second planet gear meshes with the second driven gear.

In particular, prescanning is performed when the first planet gear meshes with the first driven gear, and principal scanning is performed when the second planet gear meshes with the second driven gear.

BRIEF DESCRIPTION OF THE ACCOMPANYING DRAWINGS

DETAILED DESCRIPTION OF THE EMBODIMENTS

Figure 1:
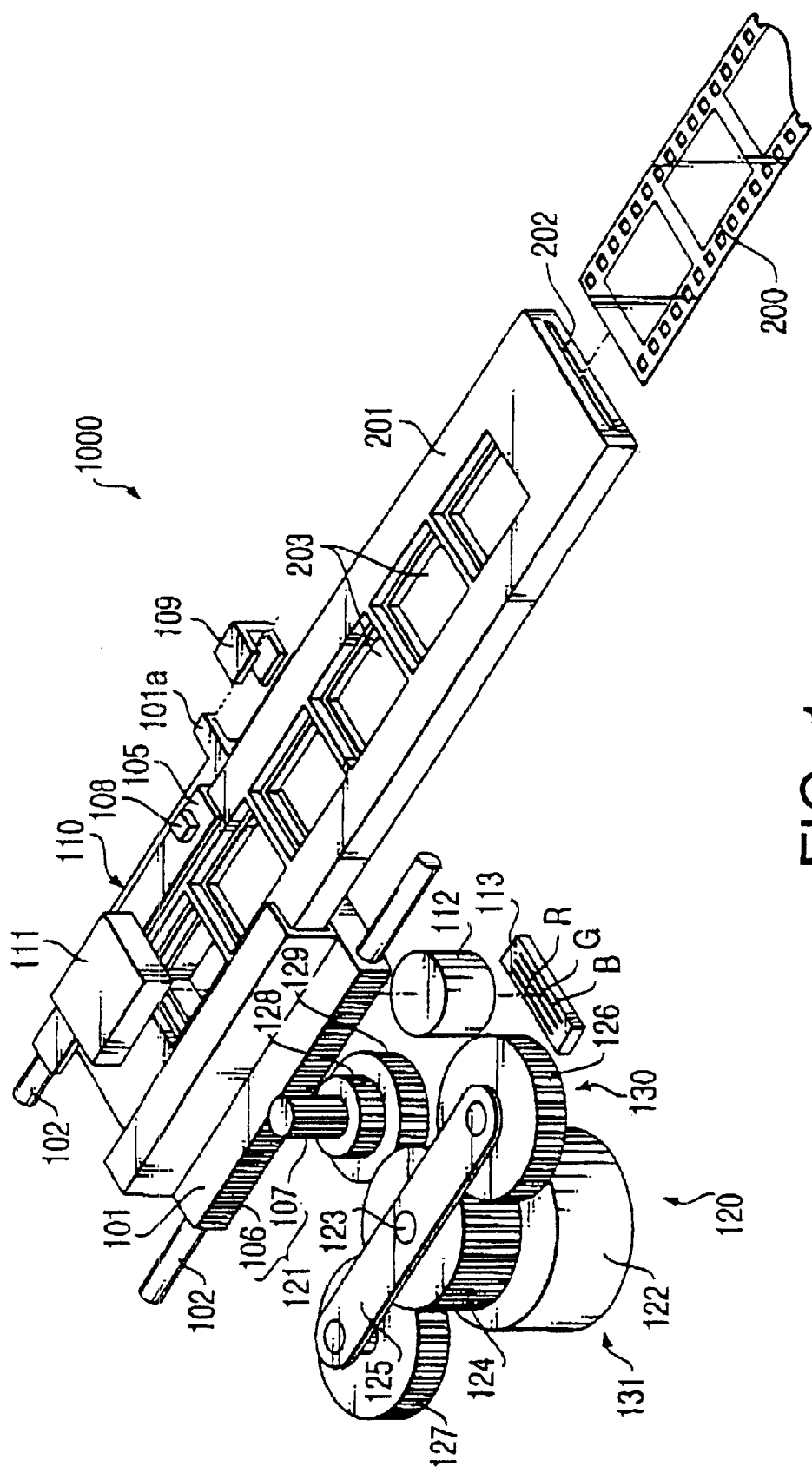
FIG. 1 is a perspective view of a part of a film scanner according to an embodiment of the invention.
Figures 2, 2A:
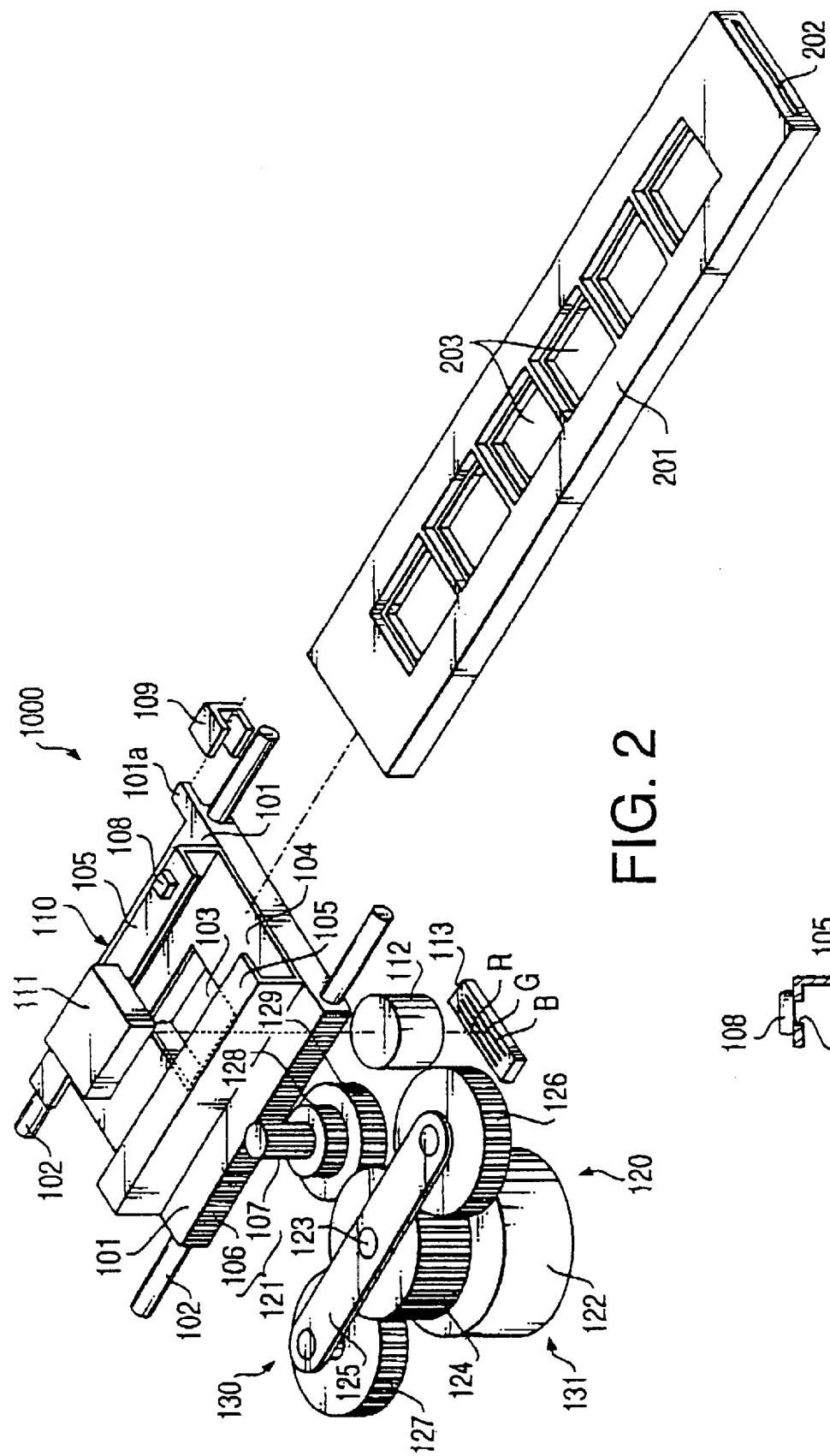
FIG. 2 is also a perspective view of a part of the film scanner according to the embodiment of the invention.
FIG. 2A is a cross sectional view of a part of a rail device.

FIGS. 1 and 2 are perspective views of a part of a film scanner 1000 according to an embodiment of the invention The film scanner 1000 has a casing (not shown) on which two guide bars 102 and 102 extending horizontally are mounted as shown in FIG. 1. A table 101 is slidably mounted on the guide bars 102 and 102. On the table 101, a film holder 201 is held. Between the guide bars 102 and 102, and at the end portion along the direction of elongation of the guide bars 102 and 102, a scanning section 110 is defined (see FIG. 2). From one side surface of the table 101, at an end portion thereof, a protrusion 101a is formed. Further, a photo interrupter 109 is provided to detects the protrusion 101a. The position of the table 101 when the protrusion 101a is detected by the photo interrupter 109 is referred to as an initial position of the table 101.

At the scanning section 110, a diffused light source 111, an imaging lens 112, and a CCD line sensor unit 113 are provided. Specifically, the light source 111 is provided above the guide bars 102 and 102. The light emitting surface of the light source 111 is directed downward. The imaging lens 112 is located beneath the light source 111 and at a level lower than the guide bars 102 and 102. Further beneath the imaging lens 112, the CCD line sensor unit 113 is located.

The CCD line sensor unit 113 includes three line sensors for RGB (Red, Green, and Blue) components. The CCD line sensor unit 113 is placed so that the direction of elongation of the line sensors is perpendicular to the direction of the elongation of the guide bars 102 and 102. The CCD line sensor unit 113 scans along the direction of elongation of the line sensors (i.e., in a main scanning direction).

The guide bars 102 and 102 are inserted in through holes pierced at both side end portions of the table 101. Therefore the table 101 slides along the guide bars 102 and 102.

As shown in FIG. 2, at a substantially central portion of the table 101, a rectangular window 103 is formed as a through opening in the thickness direction of the table 101. Each line sensor of the CCD line sensor unit 113 receives the light emitted from the light source 111 through the window 103, and outputs an image signal for each color component.

A rail device 104 is secured on the table 101 for holding a film holder 201. The rail device 104 includes a pair of L-rails 105 and 105. The L-rails 105 and 105 extend along the guide bars 102 and 102, and the film holder 201 is slidably held between the L-rails 105 and 105.

As shown in FIGS. 1 and 2, a reflection type photo interrupter 108 is provided on a top surface of one of the L-rails 105 and 105. As shown in FIG. 2A, which is a partial cross sectional view of the rail device 104, at the position where the photo interrupter 108 is provided, an opening 105a is formed on the L-rail 105. The photo interrupter 108 emits a light beam through the opening 105a, and detects the presence/absence of the film holder 201 by detecting the reflected light beam.

A rack 106 is formed on one side surface of the table 101 in a direction parallel to the direction of elongation of the guide bars 102 and 102. A pinion 107, meshing with the rack 106, is provided adjacent to one of the guide bars 102 and 102. The rack 106 and the pinion 107 form an auxiliary scanning mechanism 121 of a table control mechanism 120. The table control mechanism 120 is driven by a stepping motor 122. The table control mechanism 120 includes a geared transmission 131 which drives the pinion 107 in a forward direction (i.e., counterclockwise when viewed from the top) or a reverse direction (i.e., clockwise when viewed from the top) by rotating the stepping motor 122.

The geared transmission 131 includes a sun gear 124 which is secured to the driving shaft 123 of the motor 122, and a rotatable arm 125 in which the driving shaft 123 is inserted rotatably with respect to the driving shaft 123. At both ends of the rotatable arm 125, a first planet gear 126 and a second planet gear 127 are supported so as to mesh with the sun gear 124.

A first driven gear 128, having less teeth than the sun gear 124, is coaxially and integrally provided beneath the pinion 107. A second driven gear 129, having a greater number of teeth than the sun gear 124, is coaxially and integrally provided beneath the first driven gear 128. The number of teeth of the first driven gear 128 is a half of the number of teeth of the second driven gear 129. The pinion 107, the first driven gear 128 and the second driven gear 129 rotate integrally.

The first driven gear 128 is provided at the same height as the first planet gear 126 is, and the second driven gear 129 is settled at the same height as the second planet gear 127 is. The first planet gear 126, the second planet gear 127, the first driven gear 128 and the second driven gear 129 constitute a planet clutch 130.

A film 200, which is held by the film holder 201, is formed as a film strip having the fixed number of (e.g., 6) frames of images. The film holder 201 is slightly larger than the film 200. On the film holder 201, a slit 202, to which the film 200 is to be inserted, is formed such that it extends through the film holder 201 in the length (longitudinal) direction thereof. On the film holder 201, six frame windows 203 corresponding to the six frames of the images of the film 200 are formed as through openings in the thickness direction thereof.

In the embodiment, when a scanning operation is performed, the film holder 201 is manually inserted in the rail device 104, and a frame subject to scanning is manually located immediately above the window 103 of the table 101.

Figure 3:
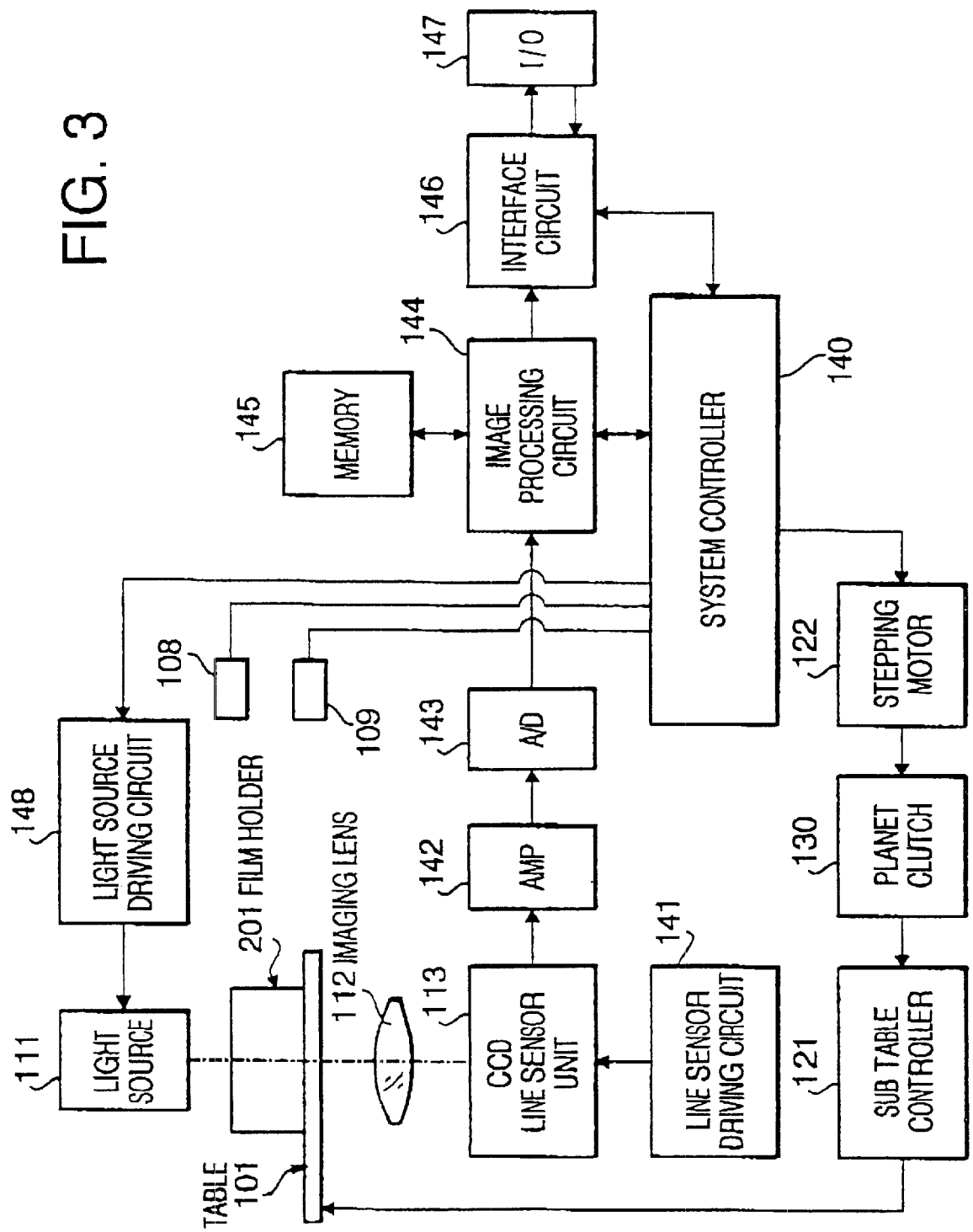
FIG. 3 is a block diagram of the film scanner according to the embodiment of the invention.

FIG. 3 is a block diagram of the film scanner according to the embodiment of the present invention. The CCD line sensor unit 113 is driven by a line sensor driving circuit 141. The image signal output by the CCD line sensor unit 113 is amplified by the amplifier 142, and converted into a digital image signal by an A/D converter 143. Then, image processing operations are applied to the digital image signal, by the image processing circuit 144, to generate a required image signal.

A memory 145 is, for example, an IC card, and is used for storing the processed image as image data. The output of the image processing circuit 144 is also transmitted, via an interface circuit 146 (e.g., SCSI or USB), to I/O terminals 147, which may be connected to an external device such as a personal computer.

The light source 111 is driven by a light source driving circuit 148, which is controlled by a system controller 140. The stepping motor 122 is driven by the system controller 140. In the embodiment, the rotation directions of the stepping motor 122 for the prescanning and for the principal scanning are opposite to each other. The stepping motor 122 drives the planet clutch 130 for driving the auxiliary scanning mechanism 121 to slide the table 101 along the guide bars 102 and 102.

The system controller 140 is also connected with the photo interrupter 109 for detecting the initial position of the table 101, and the photo interrupter 108 for detecting the absence/presence of the film holder 201.

Figure 4A:
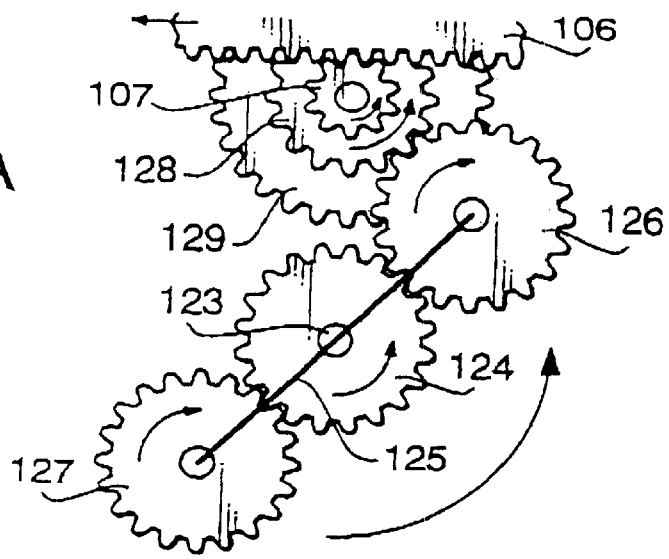
FIGS. 4A, 4B and 4C are plan views of a sun-and-planet mechanism of a film scanner according to a second embodiment of the invention.
Figure 4B:
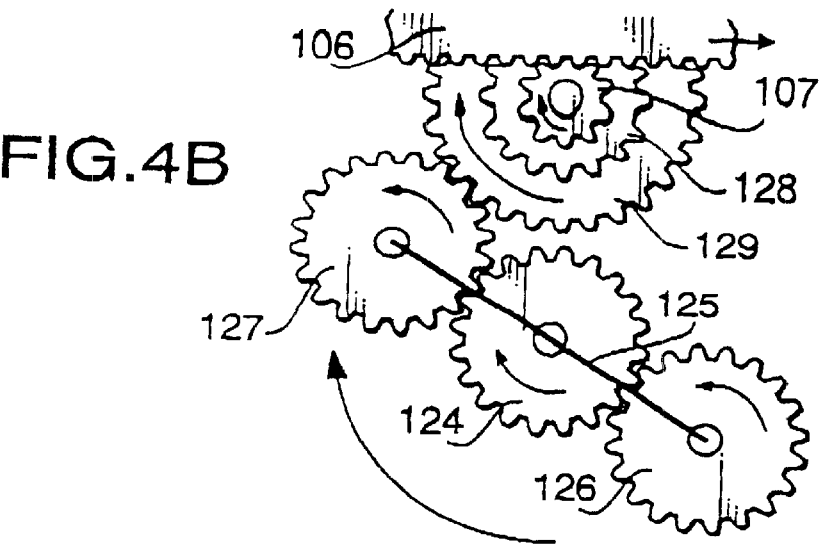
Figure 4C:
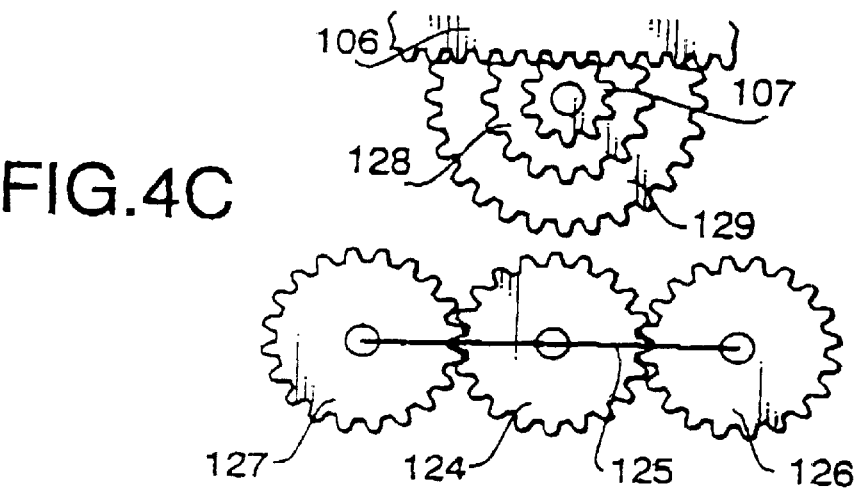

FIG. 4A, FIG. 4B and FIG. 4C are plan views illustrating the function of the table control mechanism 120.

FIG. 4A shows the table control mechanism 120 when the stepping motor 122 rotates the driving shaft 123 counterclockwise at a predetermined fixed rate. In association with rotation of the sun gear 124, the first planet gear 126 and the second planet gear 127 supported by the rotatable arm 125 move around the sun gear 124 counterclockwise in the drawing.

Then, the first planet gear 126 meshes with the first driven gear 128. The rotation of the driving shaft 123 is transmitted, through the sun gear 124 and the first planet gear 126, to the first driven gear 128. As shown in FIG. 4A, when the driving shaft 123 rotates counterclockwise, the driven gear 128 rotates counterclockwise.

Since the first driven gear 128 and the pinion 107 are integrally formed, the pinion 107 rotates counterclockwise. Therefore, the rack 106 meshing with the pinion 107 is driven to slide toward the left-hand side in FIG. 4A. Since the first driven gear 128 has less teeth than the sun gear 124, a step rotation angle of the stepping motor 122 is converted to a first step rotation angle that is greater than that of the stepping motor 122. Therefore, the rack 106, meshing with the pinion 107, slides relatively fast.

In this specification, the counterclockwise rotation of the driving shaft 123 (i.e., the stepping motor 122) will be referred to as a forward rotation, and the movement of the table 101 when the driving shaft 123 rotates forwardly will be referred to as a forward movement. Similarly, the clockwise rotation of the driving shaft 123 will be referred to as a reverse rotation, and the movement of the table 101 when the driving shaft 123 rotates reversely will be referred to as a reverse movement.

According to this definition, when the driving shaft 123 rotates forwardly, the table moves forwardly at a relatively fast speed.

FIG. 4B shows the table control mechanism 120 when the stepping motor 122 rotates the driving shaft 123 clockwise (i.e., reversely) at the predetermined fixed rate. In association with the reverse rotation of the sun gear 124, the first planet gear 126 and the second planet gear 127 supported by the rotatable arm 125 rotate around the sun gear 124 clockwise in FIG. 4B.

Then, the second planet gear 127 meshes with the second driven gear 129. Therefore, the reverse rotation of the driving shaft 123 is transmitted, through the sun gear 124 and the second planet gear 127, to the second driven gear 129.

As the second driven gear 129 rotates clockwise, the pinion 107, which is formed integrally with the second driven gear 129, rotates clockwise. Therefore, the rack 106 meshing with the pinion 107 is driven to slide reversely (i.e., toward the right-hand side in FIG. 4B). Since the second driven gear 129 has the greater number of teeth than the sun gear 124, a step rotation angle of the stepping motor 122 is converted to a second step rotation angle that is smaller than that of the stepping motor 122. Therefore, the rack 106, meshing with the pinion 107, slides slowly.

As described above, when the stepping motor 122 is driven to rotate the driving shaft 123 forwardly, the table 101 slides forwardly at a faster speed, while when the stepping motor 122 is driven to rotate the driving shaft 123 reversely, the table 101 slides reversely at a slower speed.

It should be noted that, in the embodiment, the first driven gear 128 has less teeth than the sun gear 124, and the second driven gear 129 has more teeth than the sun gear 124. However, the invention is not limited to such a configuration. Even if both the first and second driven gears 128 and 129 has less or more teeth than the sun gear, if the second driven gear 129 has more teeth than the first driven gear 128, the speed of the table 101 in the forward movement is greater than that in the reverse movement.

FIG. 4C shows the table control mechanism 120 when the rotation of the driving shaft 123 is being switched. At this time, neither the first planet gear 126 nor the second planet gear 127 meshes with the driven gears 128 and 129. Therefore, the rotation of the driving shaft 123 is not transmitted to the pinion 107, and the table does not slide.

Figure 5:
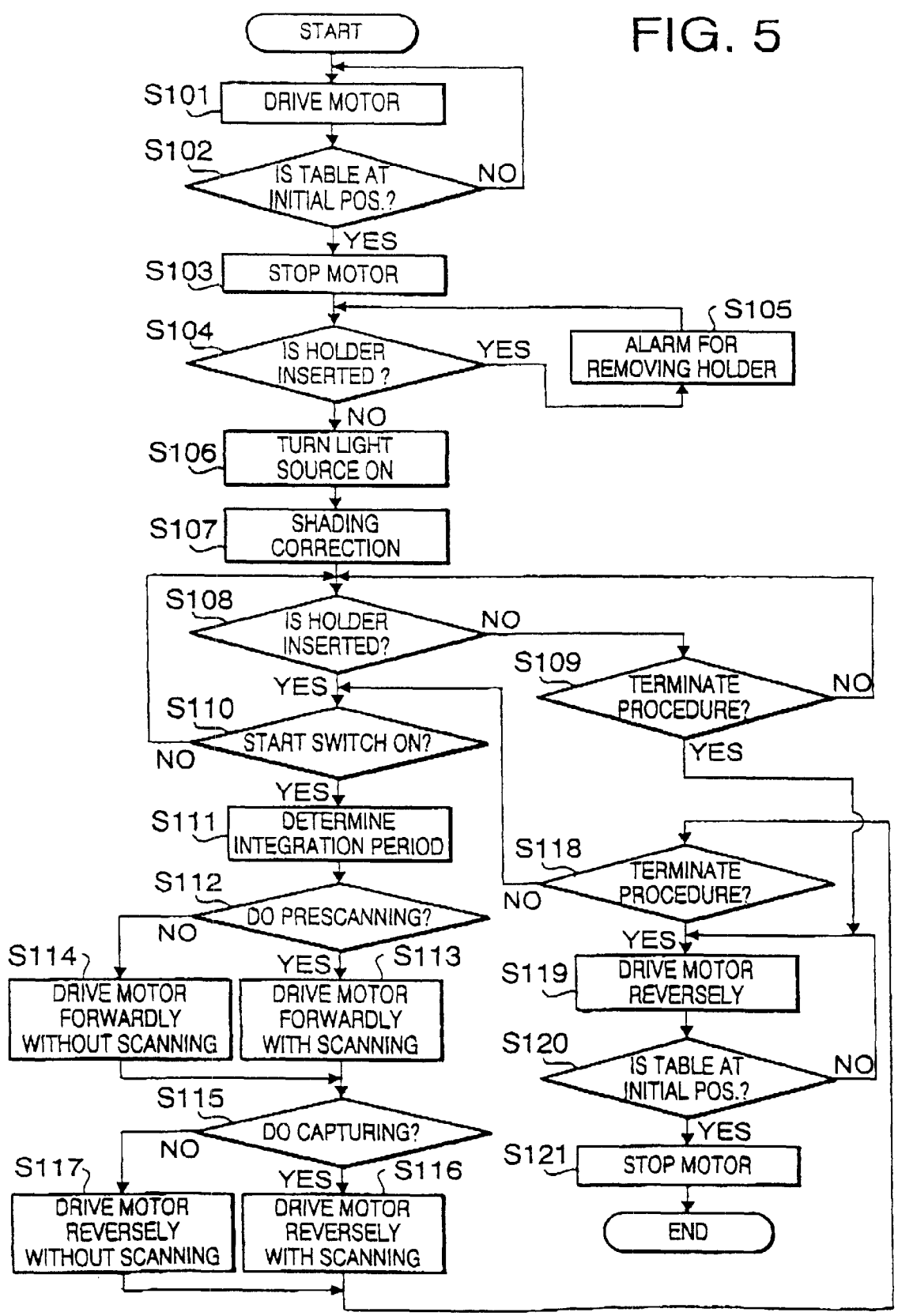
FIG. 5 is a flowchart illustrating an operation of the film scanner according to the embodiment of the present invention.

FIG. 5 is a flowchart illustrating a scanning operation of the film scanner according to the embodiment of the present invention. The procedure shown in FIG. 5 is started, for example, when a power switch (not shown) of the film scanner is turned on.

In S101, the system controller 140 drives the motor 122 to rotate the drive shaft 123 clockwise. In S102, the system controller 140 checks whether the table 101 is located at the initial position. The initial position of the table 101 is defined as a position at which the leading end, with respect to the forward movement of the table 101, of the window 103 is located substantially at the scanning position 110. If the table 101 has not yet reached the initial position (S102: NO), the motor is kept driven (S101). If the table 101 has reached the initial position (S102: YES), control proceeds to S103 where the motor 122 is stopped.

In S104, the system controller 140 detects whether the film holder 201 is inserted in the rail device 104 and therefore mounted on the table 101. The detection is made by the photo interrupter 108. If the film holder 201 has been inserted in the rail device 104 (S104: YES), a caution for removing the film holder 201 (S105) is indicated by a not shown LED indicator until the film holder 201 is removed from the table 101. If the film holder 201 is not inserted or has been removed (S104: NO), control proceeds to S106 where the light source 111 is turned ON.

In S107, based on the output of the CCD line sensor unit 113, which receives the light from the light source 111, the shading correction data is obtained.

Next, in S108, the system controller 140 detects whether the film holder 201 is inserted on the table 101. If the film holder 201 has not been inserted yet (S108: NO), the system controller 140 waits till the film holder 201 is inserted, or terminates this procedure (S109). It should be noted that the procedure is terminated when a not shown operation switch is operated or the film holder 201 has not been inserted for more than a predetermined time. If the film holder 201 has been inserted (S108: YES), control proceeds to S110.

In S110, the system controller 140 determines whether a start switch (not shown) is operated to start scanning. If the start switch is operated (S110: YES) control proceeds to S111. If the start switch is not operated (S110: NO), control returns to S108. Thus, if the film holder 201 is removed during the loop of S108 and S109, control proceeds to S109. It should be noted that the position of the frame is to be adjusted during the loop of S108 and S109 is repeated.

In S111, based on the output of the CCD line sensor unit 113, which detects the light through the film 200, an integration period of the CCD line sensor unit 113 is determined.

In S112, the system controller 140 determines whether prescanning is to be executed based on a status of a switch (not shown) which is to be operated for starting/skipping the prescanning. If prescanning is to be executed (S112: YES), the stepping motor 122 rotates the driving shaft 123 counterclockwise, so that the table 101 holding the film holder 201 slides forward at a high speed (shown in the FIG. 4A).

Then, the image formed in one frame of the film holder 201 is irradiated by the light source 111. The image is normally scanned in the main scanning direction and roughly scanned in the auxiliary scanning direction by the CCD line sensor unit 113 (S113). After prescanning as described above is performed, the trailing end of the image is located above the CCD line sensor unit 113.

If prescanning is not to be executed (S112: NO), the stepping motor 122 rotates the driving shaft 123 counterclockwise (i.e., forwardly), without driving the CCD line scanner unit 113, to slide the table 101 mounting the film holder 201 until the trailing end of the image is located above the CCD line sensor unit 113 (S114).

In S115, the system controller 140 determines whether the principal scanning is to be executed based on a status of a switch (not shown) which is to be operated for starting/skipping the principal scanning. If the principal scanning is to be executed (S115: YES), the stepping motor 122 rotates the driving shaft 123 clockwise (i.e., reversely), so that the table 101 mounting the film holder 201 slides reversely at a slow speed (shown in the FIG. 4B). The image formed in one frame of the film holder 201 is irradiated by the light source 111. The image is finely scanned by the CCD line sensor unit 113 (S116). If the principal scanning is not to be executed (S115: NO), the stepping motor 122 rotates the driving shaft 123 clockwise (i.e., reversely), without driving the CCD line scanner unit 113, to slide the table 101 mounting the film holder 201 reversely so that the trailing end, with respect to the moving direction of the table, of the image is located above the CCD line sensor unit 113 (S117), i.e., the table 101 is located at the initial position.

Next, in S118, the system controller 140 determines whether scanning is to be terminated based on a status of a switch (not shown) which is to be operated for terminating/continuing the scanning procedure. If further scanning operation is to be executed (S118: NO), control returns to S110. If scanning is to be terminated (S118: YES), the stepping motor 122 rotates the driving shaft 123 clockwise.

In S120, the system controller 140 checks whether the table 101 is located at the initial position. If the table 101 has not yet reached the initial position (S120: NO), the motor 122 is kept driven (S119). If the table 101 has reached the initial position (S120: YES), control proceeds to S121 where the motor 122 is stopped (S121), for enabling an operator to remove the film holder 201.

According to the embodiment, when the prescanning is performed, the stepping motor 122 rotates the driving shaft 123 counterclockwise to slide the table 101 together with the film holder 201 at a high speed, so that the prescanning is executed fast. While, when the normal scanning is performed, the stepping motor 122 rotates the driving shaft 123 clockwise to slide the table 101 together with the film holder 201 slowly, so that the normal scanning is executed.

Therefore, the film scanner according to the embodiment of the present invention accelerates prescanning, and enables the operator to review prescanned images immediately.

Furthermore, since the film scanner according to the embodiment switches between prescanning and the principal scanning by switching the rotating direction of motor 122, and since any lever-clutch mechanism or magnetic-clutch mechanism to switch between the prescanning and the normal scanning is not employed, the table driving mechanism is simplified.

In the above embodiment, rack-and-pinion mechanism slides the table mounting the film. However, the invention is not limited to such a configuration.

That is, for example, a lead screw mechanism or belt-and-pulley mechanism may be applied for the motor 122 sliding the table 101. The lead screw mechanism, for example, may include a lead screw elongating along the guide bar 102 which is screwed in the table 101, whereas a planet clutch as in the embodiment is provided to switche the rotating rate and direction of the lead screw. With such a configuration, the table 101 slides forward at a relatively high speed for prescanning, and slides reversely at a relatively slow speed for principal scanning.

The belt-and-pulley mechanism, for example, may include a couple of pulleys arranged along the guide bar 102, and a circular endless belt, on which the table 101 hooks, is wound around the pulleys tensely. A planet clutch as in the above-describe embodiment is provided to switche the rotating rate and speed of the pulleys. In the above embodiment, the planet clutch switches the velocity and direction of the table sliding from switching rotation of the driving shaft. However, another switching mechanism, such as the lever-clutch mechanism or magnetic-clutch mechanism, for switching the velocity and direction of the table sliding from switching rotation of the driving shaft may be applied if the mechanism becomes small. Or, for example, the table sliding may be switched by rotating the rotatable arm 125 directly.

In the above embodiment, the second driven gear has twice teeth as many as the first driven gear has. However, the invention is not limited to this ratio, that is, any ratio of the number of teeth between the first and second driven gears could be used as long as the second driven gear has more teeth than the first driven gear.

In the above embodiment, switching the scanning resolution is used for switching between capturing and prescanning. However, the invention is not limited to this purpose. That is, for example, the invention may be applied for the scanner to scan with two resolutions.

The present disclosure relates to the subject matter contained in Japanese Patent Application No. HEI 11-231654, filed on Aug. 18, 1999, which is expressly incorporated herein by reference in its entirety.

What is claimed is:

1. A film scanner for scanning an image formed on a film, comprising:

a line sensor that scans the image in a main scanning direction;

a table supporting the film, said table being slidable forwardly and reversely in an auxiliary scanning direction that is perpendicular to the main scanning direction;

a driving source generating a driving force;

a table driving mechanism that drives said table in the auxiliary scanning direction;

a geared transmission that receives the driving force of said driving source and outputs, to said table driving mechanism, one of a first and a second driving force, the first driving force being a force with which the table driving mechanism drives said table in a forward direction at a first speed, the second driving force being a force with which the table driving mechanism drives said table in a reverse direction at a second speed that is different from the first speed;

said geared transmission including a planet clutch provided with:

a sun gear secured to a driving shaft of said driving source;

first and second planet gears meshing with said sun gear, said first and second planet gears being rotatable around said sun gear in association with the rotation of said sun gear; and first and second driven gears, said first and second driven gears having different numbers of teeth, said first planet gear meshing with said first driven gear when said sun gear rotates forwardly, said second planet gear meshing with said second driven gear when said sun gear rotates reversely.

2. The film scanner according to claim 1, wherein said drive source comprises a stepping motor.

3. The film scanner according to claim 1, wherein when said first planet gear meshes with said first driven gear, said second planet gear disengaged from said second driven gear, and wherein when said second planet gear meshes with said second driven gear, said first planet gear disengaged from said first driven gear.

4. The film scanner according to claim 3, wherein said planet clutch comprises a rotatable arm rotatably supported by the driving shaft of said driving source, said rotatable arm extending in a radial direction of said sun gear, said first and second planet gears being rotatably supported at end portions of said rotatable arm.

5. A film scanner for scanning an image formed on a film, comprising:

a line sensor that scans the image in a main scanning direction;

a table supporting the film, said table being slidable forwardly and reversely in an auxiliary scanning direction that is perpendicular to the main scanning direction;

a driving source generating a driving force;

a table driving mechanism that drives said table in the auxiliary scanning direction;

a geared transmission that receives the driving force of said driving source and outputs, to said table driving mechanism, one of a first and a second driving force, the first driving force being a force with which the table driving mechanism drives said table in a forward direction at a first speed, the second driving force being a force with which the table driving mechanism drives said table in a reverse direction at a second speed that is different from the first speed;

said table driving mechanism comprising:

a pinion, said pinion being integrally formed and rotatable coaxially with first and second driven gears of said geared transmission; and a rack formed on one surface of said table, said rack meshing with said pinion.

6. The film scanner according to claim 1, further comprising a film holder in which the film is inserted, said film holder being slidably supported on said table so that a desired frame of the image formed on the film could be scanned.

7. The film scanner according to claim 1, wherein said first speed is greater than said second speed.

8. The film scanner according to claim 7, wherein prescanning at a lower resolution is performed when said first planet gear meshes with said first driven gear, and wherein a principle scanning at a higher resolution is performed when said second planet gear meshes with said second driven gear.

9. The film scanner according to claim 7, wherein scanning at a lower resolution is performed when said first planet gear meshes with said first driven gear, and wherein scanning at a higher resolution is performed when said second planet gear meshes with said second driven gear.

10. The film scanner according to claim 5, wherein said drive source comprises a stepping motor.

11. The film scanner according to claim 5, further comprising a film holder in which the film is inserted, said film holder being slidably supported on said table so that a desired frame of the image formed on the film could be scanned.

12. The film scanner according to claim 5, wherein said first speed is greater than said second speed.

13. The film scanner according to claim 12, wherein prescanning at a lower resolution is performed when a first planet gear of said geared transmission meshes with said first driven gear, and wherein a principle scanning at a higher resolution is performed when a second planet gear of said geared transmission meshes with said second driven gear.

14. The film scanner according to claim 12, wherein scanning at a lower resolution is performed when a first planet gear of said geared transmission meshes with said first driven gear, and wherein scanning at a higher resolution is performed when a second planet gear of said geared transmission meshes with said second driven gear.

* * * * *